US009275652B2

(12) United States Patent
Disch et al.

(10) Patent No.: US 9,275,652 B2
(45) Date of Patent: Mar. 1, 2016

(54) DEVICE AND METHOD FOR MANIPULATING AN AUDIO SIGNAL HAVING A TRANSIENT EVENT

(75) Inventors: Sascha Disch, Fuerth (DE); Frederik Nagel, Nuremberg (DE); Nikolaus Rettelbach, Nuremberg (DE); Markus Multrus, Nuremberg (DE); Guillaume Fuchs, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1002 days.

(21) Appl. No.: 12/921,550

(22) PCT Filed: Feb. 17, 2009

(86) PCT No.: PCT/EP2009/001108
§ 371 (c)(1), (2), (4) Date: Jan. 5, 2011

(87) PCT Pub. No.: WO2009/112141
PCT Pub. Date: Sep. 17, 2009

(65) Prior Publication Data

US 2011/0112670 A1 May 12, 2011

Related U.S. Application Data

(60) Provisional application No. 61/035,317, filed on Mar. 10, 2008.

(51) Int. Cl.
*G06F 17/00* (2006.01)
*G10L 21/04* (2013.01)
*G10L 19/025* (2013.01)

(52) U.S. Cl.
CPC ............... *G10L 21/04* (2013.01); *G10L 19/025* (2013.01)

(58) Field of Classification Search
CPC .............................. G10L 21/04; G10L 19/025
USPC ........................................................... 700/94
See application file for complete search history.

(56) References Cited

U.S. PATENT DOCUMENTS 5,754,427 A 5/1998 Akagiri
5,901,234 A * 5/1999 Sonohara et al. ............ 381/104

(Continued)

FOREIGN PATENT DOCUMENTS

CN 1511312 7/2004
EP 1111586 6/2001

(Continued)

OTHER PUBLICATIONS

Noguchi, Kenichi et al., "Non Stationary Noise Detection and Reduction of a Single Channel Input", NTT Cyber Space Labs. NTT Corporation, Tokyo, Japan, Mar. 2004.

(Continued)

*Primary Examiner* — Paul McCord
(74) *Attorney, Agent, or Firm* — Michael A. Glenn; Perkins Coie LLP

(57) ABSTRACT

A signal manipulator for manipulating an audio signal having a transient event may have a transient remover, a signal processor and a signal inserter for inserting a time portion in a processed audio signal at a signal location where the transient event was removed before processing by the transient remover, so that a manipulated audio signal has a transient event not influenced by the processing, whereby the vertical coherence of the transient event is maintained instead of any processing performed in the signal processor, which would destroy the vertical coherence of a transient.

12 Claims, 13 Drawing Sheets

(56) References Cited

U.S. PATENT DOCUMENTS

| | | | | |
|---|---|---|---|---|
| 6,049,766 | A | 4/2000 | Laroche | |
| 6,266,003 | B1 * | 7/2001 | Hoek | 341/155 |
| 6,266,644 | B1 * | 7/2001 | Levine | 704/503 |
| 6,316,712 | B1 | 11/2001 | Laroche | |
| 6,549,884 | B1 | 4/2003 | Laroche et al. | |
| 6,766,300 | B1 | 7/2004 | Laroche | |
| 6,876,968 | B2 | 4/2005 | Veprek | |
| 6,982,377 | B2 | 1/2006 | Sakurai et al. | |
| 7,565,289 | B2 * | 7/2009 | Rogers | 704/229 |
| 7,917,358 | B2 | 3/2011 | Rogers | |
| 7,933,768 | B2 * | 4/2011 | Kikumoto | 704/209 |
| 8,121,836 | B2 | 2/2012 | Liebchen | |
| 8,170,882 | B2 * | 5/2012 | Davis | 704/500 |
| 8,239,190 | B2 | 8/2012 | Kapoor et al. | |
| 8,255,233 | B2 | 8/2012 | Liljeryd et al. | |
| 8,270,439 | B2 * | 9/2012 | Herr et al. | 370/537 |
| 8,379,868 | B2 * | 2/2013 | Goodwin et al. | 381/17 |
| 8,380,331 | B1 * | 2/2013 | Smaragdis et al. | 700/94 |
| 8,473,298 | B2 * | 6/2013 | Rogers | 704/265 |
| 2002/0138795 | A1 * | 9/2002 | Wang | 714/707 |
| 2004/0078194 | A1 * | 4/2004 | Liljeryd et al. | 704/200.1 |
| 2004/0122662 | A1 * | 6/2004 | Crockett | 704/200.1 |
| 2004/0133423 | A1 * | 7/2004 | Crockett | 704/229 |
| 2004/0165730 | A1 * | 8/2004 | Crockett | 381/56 |
| 2004/0181403 | A1 * | 9/2004 | Hsu | 704/230 |
| 2004/0196989 | A1 | 10/2004 | Friedman et al. | |
| 2005/0177372 | A1 * | 8/2005 | Wang et al. | 704/273 |
| 2006/0002572 | A1 * | 1/2006 | Smithers et al. | 381/104 |
| 2006/0004583 | A1 | 1/2006 | Herre et al. | |
| 2006/0053018 | A1 | 3/2006 | Engdegard et al. | |
| 2006/0098827 | A1 | 5/2006 | Paddock et al. | |
| 2006/0100885 | A1 * | 5/2006 | Oh | 704/503 |
| 2006/0200344 | A1 * | 9/2006 | Kosek et al. | 704/226 |
| 2007/0078541 | A1 * | 4/2007 | Rogers | 700/94 |
| 2007/0078650 | A1 * | 4/2007 | Rogers | 704/229 |
| 2007/0185707 | A1 | 8/2007 | Gerrits et al. | |
| 2007/0198254 | A1 * | 8/2007 | Goto et al. | 704/226 |
| 2008/0002842 | A1 | 1/2008 | Neusinger et al. | |
| 2008/0031463 | A1 | 2/2008 | Davis | |
| 2008/0047414 | A1 * | 2/2008 | Friedman et al. | 84/609 |
| 2008/0097750 | A1 * | 4/2008 | Seefeldt et al. | 704/201 |
| 2008/0275580 | A1 * | 11/2008 | Andersen | 700/94 |
| 2009/0024234 | A1 * | 1/2009 | Archibald | 700/94 |
| 2009/0216353 | A1 * | 8/2009 | Van Reck | 700/94 |
| 2009/0220109 | A1 * | 9/2009 | Crockett et al. | 381/107 |
| 2009/0272253 | A1 * | 11/2009 | Yamashita et al. | 84/611 |
| 2009/0276069 | A1 | 11/2009 | Rogers | |
| 2011/0004479 | A1 * | 1/2011 | Ekstrand et al. | 704/500 |
| 2011/0112670 | A1 * | 5/2011 | Disch et al. | 700/94 |
| 2012/0215546 | A1 | 8/2012 | Biswas et al. | |

FOREIGN PATENT DOCUMENTS

| | | |
|---|---|---|
| JP | 11-194796 | 7/1999 |
| JP | 2001-075571 | 3/2001 |
| JP | 2004-527000 | 9/2004 |
| KR | 1020050043800 | 5/2005 |
| KR | 20070001185 | 1/2007 |
| RU | 2226032 | 3/2004 |
| RU | 2294565 | 2/2007 |
| WO | WO02/084645 | 10/2002 |
| WO | WO-02/084645 | 10/2002 |

OTHER PUBLICATIONS

Misra, et al., "A New Paradigm for Sound Design", Proc. of the 9th Int'l Conference on Digital Audio Effects (DAFx-06), Montreal, Canada, Sep. 18-20, 2006, pp. 319-324.

Nsabimana, et al., "Transient Encoding of Audio Signals Usign Dyadic Approxmations", Proc. of the 10th Int'l Conference on Digital Audio Effects (DAFx-07), Bordeaux, France, Sep. 10-15, 2007, pp. 1-8.

Verma, et al., "Extending Spectral Modeling Synthesis with Transient Modeling Sythesis", Computer Music Journal; 24:2; Massachusetts Institute of Technology, Summer 2000, pp. 47-59.

Dolson, Mark; "The Phase Vocoder: A Tutorial"; Winter 1986, Computer Music Journal, vol. 10, No. 4, pp. 14-27.

Duxbury, C. et al.; "Separation of Transient Information in Musical Audio Using Multiresolution Analysis Techniques"; Dec. 6-8, 2001; Proc. of the COST G-6 Conf. on Digital Audio Effects (DAFX-01), Limerick, Ireland, 4 pages.

Flanagan, J.L. et al.; "The Bell System Technical Journal"; Nov. 1966, pp. 1394-1509.

Laroche, J. et al.; "Improved Phase Vocoder Time-Scale Modification of Audio"; May 1999; IEEE Transaction on Audio and Speech Processing, vol. 7 , No. 3, 10 pages.

Laroche, Jean et al.; "New Phase-Vocoder Techniques for Pitch Shifting, Harmonizing and Other Exotic Effects"; Oct. 17-20, 1999; Proc. IEEE Workshop on Applications of Signal Processing to Audio and Acoustics, New Paltz, NY, pp. 91-94.

Nsabimana, F.X. et al.; "Audio Signal Decomposition for Pitch and Time Scaling"; Mar. 12-14, 2008; IEEE Int'l Symposium on Communications, Control and Signal Processing (ISCCSP 2008), Piscataway, NJ, pp. 1285-1290, XP031269268.

Puckette, Miller; "Phase-locked Vocoder"; Oct. 1995, IEEE ASSP Conf. on Application of Signal Processing to Audio and Acoustics; 4 pages.

Ravelli, E. et al.; "Fast Implementaion for Non-Linear Time-Scaling of Stereo Signals"; Sep. 20-22, 2005; Proc. of the 8th Int. Conf. on Digital Audio Effects (DAFX '05), Madrid, Spain, 4 pages.

Roebel, A.; "A New Approach to Transient Processing in the Phase Vocoder"; Sep. 8-11, 2003; Proc. of the 6th Int. Conf. on Digital Audio Effects (DAFX-03), London, UK, 6 pages.

Dutilleux, et al.; "DAFX: Digital Audio Effects"; Feb. 26, 2002, Wiley & sons, Edition 1, pp. 201-298.

Fielder, L. D. et al., "Introduction to Dolby Digital Plus, an Enhancement to the Dolby Digital Coding System", Dolby Laboratories, San Francisco, CA, USA; Presented at the AES 117th Convention, Convention Paper 6196; San Francisco, CA, USA, Oct. 28-31, 2004, pp. 1-29.

* cited by examiner (filterbank implementation)

(transform implementation)

(Encoder Side)

(Decoder Side)

DEVICE AND METHOD FOR MANIPULATING AN AUDIO SIGNAL HAVING A TRANSIENT EVENT

CROSS-REFERENCE TO RELATED APPLICATIONS

This application is a U.S. National Phase entry of PCT/EP2009/001108 filed Feb. 17, 2009, and claims priority to U.S. Patent Application Ser. No. 61/035,317 filed Mar. 10, 2008, each of which is incorporated herein by references hereto.

BACKGROUND OF THE INVENTION

The present invention relates to audio signal processing and, particularly, to audio signal manipulation in the context of applying audio effects to a signal containing transient events.

It is known to manipulate audio signals such that the reproduction speed is changed, while the pitch is maintained. Known methods for such a procedure are implemented by phase vocoders or methods, like (pitch synchronous) overlap-add, (P)SOLA, as, for example, described in J. L. Flanagan and R. M. Golden, The Bell System Technical Journal, November 1966, pp. 1394 to 1509; U.S. Pat. No. 6,549,884 Laroche, J. & Dolson, M.: Phase-vocoder pitch-shifting; Jean Laroche and Mark Dolson, New Phase-Vocoder Techniques for Pitch-Shifting, Harmonizing And Other Exotic Effects", Proc. 1999 IEEE Workshop on Applications of Signal Processing to Audio and Acoustics, New Paltz, N.Y., Oct. 17-20, 1999; and Zölzer, U: DAFX: Digital Audio Effects; Wiley & Sons; Edition: 1 (Feb. 26, 2002); pp. 201-298.

Additionally, audio signals can be subjected to a transposition using such methods, i.e. phase vocoders or (P)SOLA where the special issue of this kind of transposition is that the transposed audio signal has the same reproduction/replay length as the original audio signal before transposition, while the pitch is changed. This is obtained by an accelerated reproduction of the stretched signals where the acceleration factor for performing the accelerated reproduction depends on the stretching factor for stretching the original audio signal in time. When one has a time-discrete signal representation, this procedure corresponds to a down-sampling of the stretched signal or decimation of the stretched signal by a factor equal to the stretching factor where the sampling frequency is maintained.

A specific challenge in such audio signal manipulations are transient events. Transient events are events in a signal in which the energy of the signal in the whole band or in a certain frequency range is rapidly changing, i.e. rapidly increasing or rapidly decreasing. Characteristic features of specific transients (transient events) are the distribution of signal energy in the spectrum. Typically, the energy of the audio signal during a transient event is distributed over the whole frequency while, in non-transient signal portions, the energy is normally concentrated in the low frequency portion of the audio signal or in specific bands. This means that a non-transient signal portion, which is also called a stationary or tonal signal portion has a spectrum, which is non-flat. In other words, the energy of the signal is included in a comparatively small number of spectral lines/spectral bands, which are strongly raised over a noise floor of an audio signal. In a transient portion however, the energy of the audio signal will be distributed over many different frequency bands and, specifically, will be distributed in the high frequency portion so that a spectrum for a transient portion of the audio signal will be comparatively flat and will, in any event be flatter than a spectrum of a tonal portion of the audio signal. Typically, a transient event is a strong change in time, which means that the signal will include many higher harmonics when a Fourier decomposition is performed. An important feature of these many higher harmonics is that the phases of these higher harmonics are in a very specific mutual relationship so that a superposition of all these sine waves will result in a rapid change of signal energy. In other words, there exists a strong correlation across the spectrum.

The specific phase situation among all harmonics can also be termed as a "vertical coherence". This "vertical coherence" is related to a time/frequency spectrogram representation of the signal where a horizontal direction corresponds to the development of the signal over time and where the vertical dimension describes the interdependence over the frequency of the spectral components (transform frequency bins) in one short-time spectrum over frequency.

Due to the typical processing steps, which are performed in order to time stretch or shorten an audio signal, this vertical coherence is destroyed, which means that a transient is "smeared" over time when a transient is subjected to a time stretching or time shortening operation as e.g. performed by a phase vocoder or any other method, which performs a frequency-dependent processing introducing phase shifts into the audio signal, which are different for different frequency coefficients.

When the vertical coherence of transients is destroyed by an audio signal processing method, the manipulated signal will be very similar to the original signal in stationary or non-transient portions, but the transient portions will have a reduced quality in the manipulated signal. The uncontrolled manipulation of the vertical coherence of a transient results in temporal dispersion of the same, since many harmonic components contribute to a transient event and changing the phases of all these components in an uncontrolled manner inevitably results in such artifacts.

However, transient portions are extremely important for the dynamics of an audio signal, such as a music signal or a speech signal where sudden changes of energy in a specific time represent a great deal of the subjective user impression on the quality of the manipulated signal. In other words, transient events in an audio signal are typically quite remarkable "milestones" of an audio signal, which have an over-proportional influence on the subjective quality impression. Manipulated transients in which the vertical coherence has been destroyed by a signal processing operation or has been degraded with respect to the transient portion of the original signal will sound distorted, reverberant and unnatural to the listener.

Some current methods stretch the time around the transients to a higher extent so as to have to subsequently perform, during the duration of the transient, no or only minor time stretching. Such known references and patents describe methods for time and/or pitch manipulation. Known references are: Laroche L., Dolson M.: Improved phase vocoder timescale modification of audio", IEEE Trans. Speech and Audio Processing, vol. 7, no. 3, pp. 323-332; Emmanuel Ravelli, Mark Sandler and Juan P. Bello: Fast implementation for non-linear time-scaling of stereo audio; Proc. of the 8$^{th}$ Int. Conference on Digital Audio Effects (DAFx'05), Madrid, Spain, Sep. 20-22, 2005; Duxbury, C. M. Davies, and M. Sandler (2001, December). Separation of transient information in musical audio using multiresolution analysis techniques. In Proceedings of the COST G-6 Conference on Digital Audio Effects (DAFX-01), Limerick, Ireland; and Röbel, A.: A NEW APPROACH TO TRANSIENT PROCESSING IN THE PHASE VOCODER; Proc. of the $6^{th}$ Int. Conference on Digital Audio Effects (DAFx-03), London, UK, Sep. 8-11, 2003.

During time stretching of audio signals by phase vocoders, transient signal portions are "blurred" by dispersion, since the so-called vertical coherence of the signal is impaired. Methods using so-called overlap-add methods, like (P)SOLA may generate disturbing pre- and post-echoes of transient sound events. These problems may actually be addressed by increased time stretching in the environment of transients; however, if a transposition is to occur, the transposition factor will no longer be constant in the environment of the transients, i.e. the pitch of superimposed (possibly tonal) signal components will change and will be perceived as a disturbance.

SUMMARY

According to an embodiment, an apparatus for manipulating an audio signal having a transient event may have a signal processor for processing a transient reduced audio signal in which a first time portion having the transient event is removed or, for processing an audio signal having the transient event to acquire a processed audio signal; a signal inserter for inserting a second time portion into the processed audio signal at a signal location, where the first portion was removed or where the transient event is located in the processed audio signal, wherein the second time portion has a transient event not influenced by the processing performed by the signal processor so that a manipulated audio signal is acquired.

According to another embodiment, an apparatus for generating a meta data signal for an audio signal having a transient event may have a transient detector for detecting a transient event in the audio signal; a meta data calculator for generating the meta data indicating a time position of the transient event in the audio signal or indicating a start-time instant before the transient event or a stop-time instant subsequent to the transient event or a duration of a time portion of the audio signal including the transient event; and a signal output interface for generating the meta data signal either having the meta data or having the audio signal and the meta data for transmission or storage.

According to another embodiment, a method of manipulating an audio signal having a transient event may have the steps of processing a transient reduced audio signal in which a first time portion having the transient event is removed or for processing an audio signal having the transient event to acquire a processed audio signal; inserting a second time portion into the processed audio signal at a signal location, where the first portion was removed or where the transient event is located in the processed audio signal, wherein the second time portion has a transient event not influenced by the processing so that a manipulated audio signal is acquired.

According to another embodiment, a method of generating a meta data signal for an audio signal having a transient event may have the steps of detecting a transient event in the audio signal; generating the meta data indicating a time position of the transient event in the audio signal or indicating a start-time instant before the transient event or a stop-time instant subsequent to the transient event or a duration of a time portion of the audio signal including the transient event; and generating the meta data signal either having the meta data or having the audio signal and the meta data for transmission or storage.

According to another embodiment, a meta data signal for an audio signal may have transient event, the meta data signal having information indicating a time position of the transient event in the audio signal or indicating a start-time instant before the transient event or a stop-time instant subsequent to the transient event or a duration of a time portion of the audio signal indicating the transient event and an information on the position of the time portion in the audio signal.

According to another embodiment, a computer program may have a program code for performing, when running on a computer, the method of manipulating an audio signal having a transient event, which may have the steps of processing a transient reduced audio signal in which a first time portion having the transient event is removed or for processing an audio signal having the transient event to acquire a processed audio signal; inserting a second time portion into the processed audio signal at a signal location, where the first portion was removed or where the transient event is located in the processed audio signal, wherein the second time portion has a transient event not influenced by the processing so that a manipulated audio signal is acquired, or the method of generating a meta data signal for an audio signal having a transient event which may have the steps of detecting a transient event in the audio signal; generating the meta data indicating a time position of the transient event in the audio signal or indicating a start-time instant before the transient event or a stop-time instant subsequent to the transient event or a duration of a time portion of the audio signal including the transient event; and generating the meta data signal either having the meta data or having the audio signal and the meta data for transmission or storage.

For addressing the quality problems occurring in an uncontrolled processing of transient portions, the present invention makes sure that transient portions are not processed at all in a detrimental way, i.e. are removed before processing and are reinserted after processing or the transient events are processed, but are removed from the processed signal and replaced by non-processed transient events.

The transient portions inserted into the processed signal are copies of corresponding transient portions in the original audio signal so that the manipulated signal consists of a processed portion not including a transient and a non- or differently processed portion including the transient. Exemplarily, the original transient can be subjected to decimation or any kind of weighting or parameterized processing. Alternatively, however, transient portions can be replaced by synthetically-created transient portions, which are synthesized in such a way that the synthesized transient portion is similar to the original transient portion with respect to some transient parameters such as the amount of energy change in a certain time or any other measure characterizing a transient event. Thus, one could even characterize a transient portion in the original audio signal and one could remove this transient before processing or replace the processed transient by a synthesized transient, which is synthetically created based on transient parametric information. For efficiency reasons, however, it is advantageous to copy a portion of the original audio signal before manipulation and to insert this copy into the processed audio signal, since this procedure guarantees that the transient portion in the processed signal is identical to the transient of the original signal. This procedure will make sure that the specific high influence of transients on a sound signal perception are maintained in the processed signal compared to the original signal before processing. Thus, a subjective or objective quality with respect to the transients is not degraded by any kind of audio signal processing for manipulating an audio signal.

In embodiments, the present application provides a novel method for a perceptual favorable treatment of transient sound events within the framework of such processing, which would otherwise generate a temporal "blurring" by dispersion of a signal. This method essentially comprises the removal of the transient sound events prior to the signal manipulation for the purpose of time stretching and, subsequently, adding, while taking into account the stretching, the unprocessed transient signal portion to the modified (stretched) signal in an accurate manner.

BRIEF DESCRIPTION OF THE DRAWINGS

Embodiments of the present invention are subsequently explained with reference to the accompanying drawings, in which.

DETAILED DESCRIPTION OF THE INVENTION

Figure 1:
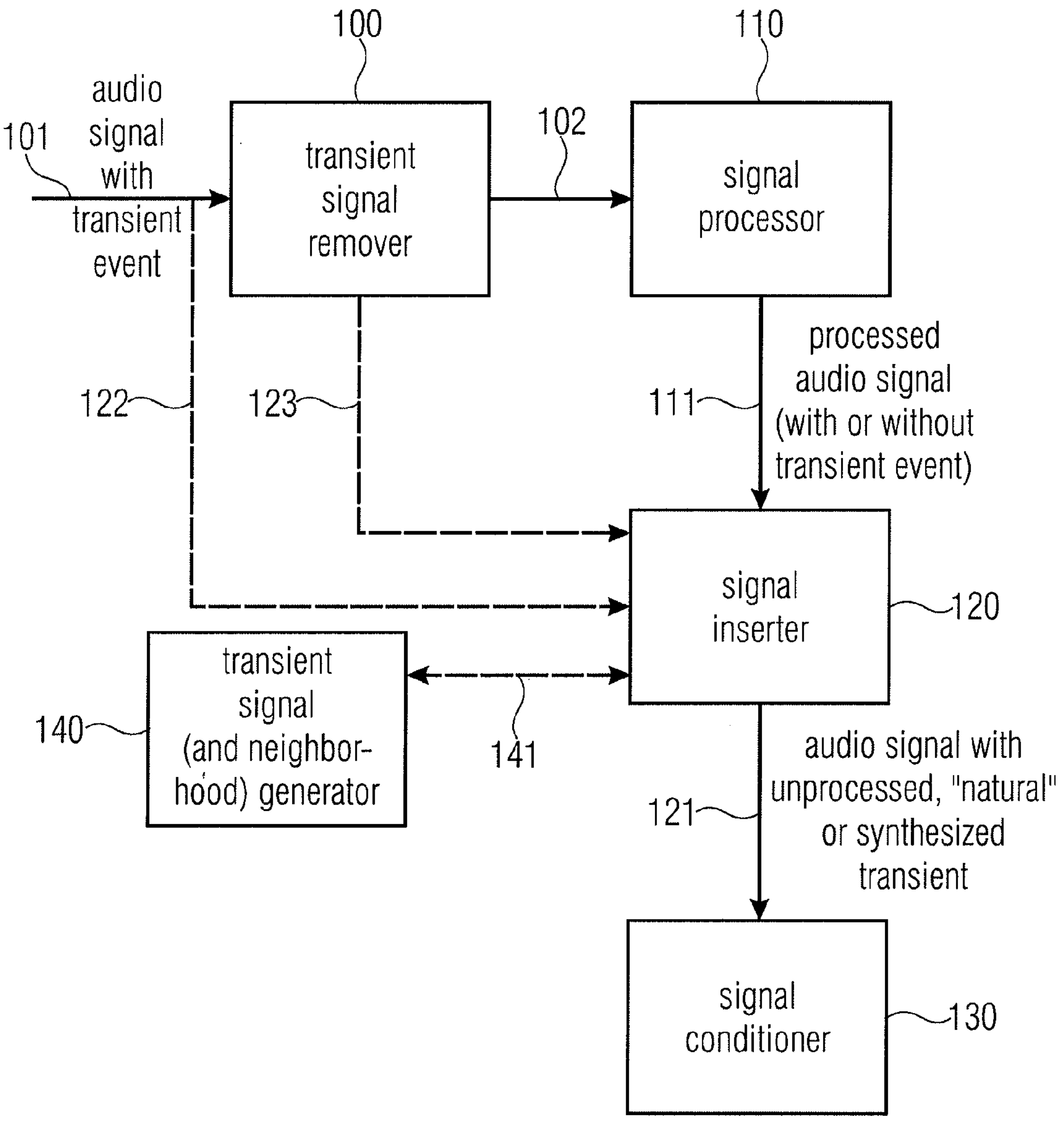
FIG. 1 illustrates an embodiment of an inventive apparatus or method for manipulating an audio signal having a transient.

FIG. 1 illustrates an apparatus for manipulating an audio signal having a transient event. The apparatus comprises a transient signal remover 100 having an input 101 for an audio signal with a transient event. The output 102 of the transient signal remover is connected to a signal processor 110. The signal processor output 111 is connected to a signal inserter 120. The signal inserter output 121 on which a manipulated audio signal with an unprocessed "natural" or synthesized transient is available may be connected to a further device such as a signal conditioner 130, which can perform any further processing of the manipulated signal such as a downsampling/decimation to be needed for bandwidth extension purposes as discussed in connection with FIGS. 7A and 7B.

However, the signal conditioner 130 cannot be used at all if the manipulated audio signal obtained at the output of the signal inserter 120 is used as it is, i.e. is stored for further processing, is transmitted to a receiver or is transmitted to a digital/analog converter which, in the end, is connected to a loudspeaker equipment to finally generate a sound signal representing the manipulated audio signal.

In the case of bandwidth extension, the signal on line 121 can already be the high band signal. Then, the signal processor has generated the high band signal from the input low band signal, and the lowband transient portion extracted from the audio signal 101 would have to be put into the frequency range of the high band, which is done by a signal processing not disturbing the vertical coherence, such as a decimation. This decimation would be performed before the signal inserter so that the decimated transient portion is inserted in the high band signal at the output of block 110. In this embodiment, the signal conditioner would perform any further processing of the high band signal such as envelope shaping, noise addition, inverse filtering or adding of harmonics etc. as done e.g. in MPEG 4 Spectral Band Replication.

The signal inserter 120 receives side information from the remover 100 via line 123 in order to choose the right portion from the unprocessed signal to be inserted in 111

When the embodiment having devices 100, 110, 120, 130 is implemented, a signal sequence as discussed in connection with FIGS. 8*a* to 8*e* may be obtained. However, it is not necessarily needed to remove the transient portion before performing the signal processing operation in the signal processor 110. In this embodiment, the transient signal remover 100 is not needed and the signal inserter 120 determines a signal portion to be cut out from the processed signal on output 111 and to replace this cut-out signal by a portion of the original signal as schematically illustrated by line 121 or by a synthesized signal as illustrated by line 141 where this synthesized signal can be generated in a transient signal generator 140. In order to be able to generate a suitable transient, the signal inserter 120 is configured to communicate transient description parameters to the transient signal generator. Therefore, the connection between blocks 140 and 120 as indicated by item 141 is illustrated as a two-way connection. When a specific transient detector is provided in the apparatus for manipulating, then the information on the transient can be provided from this transient detector (not shown in FIG. 1) to the transient signal generator 140. The transient signal generator may be implemented to have transient samples, which can directly be used or to have pre-stored transient samples, which can be weighted using transient parameters in order to actually generate/synthesize a transient to be used by the signal inserter 120.

In one embodiment, the transient signal remover 100 is configured for removing a first time portion from the audio signal to obtain a transient-reduced audio signal, wherein the first time portion comprises the transient event.

Furthermore, the signal processor is configured for processing the transient-reduced audio signal in which a first time portion comprising the transient event is removed or for processing the audio signal including the transient event to obtain the processed audio signal on line 111.

The signal inserter 120 is configured for inserting a second time portion into the processed audio signal at a signal location where the first time portion has been removed or where the transient event is located in the audio signal, wherein the second time portion comprises a transient event not influenced by the processing performed by the signal processor 110 so that the manipulated audio signal at output 121 is obtained.

Figure 2:
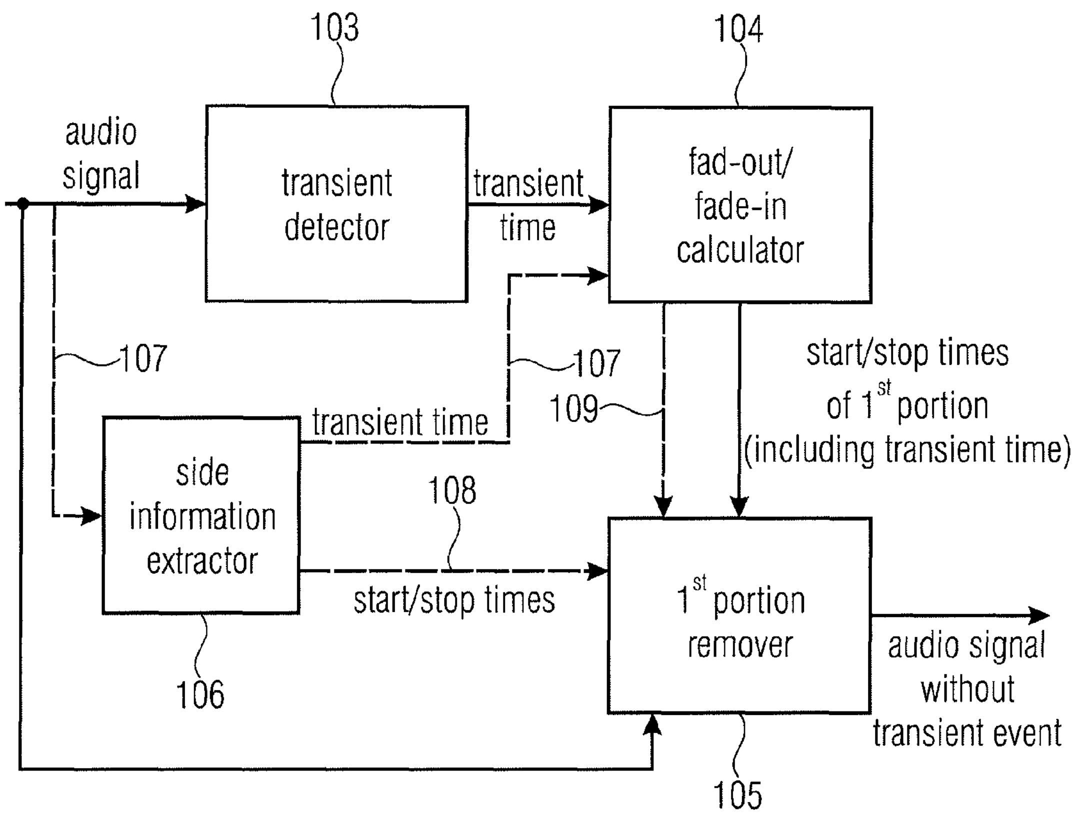
FIG. 2 illustrates an implementation of a transient signal remover of FIG. 1.

FIG. 2 illustrates an embodiment of the transient signal remover 100. In one embodiment in which the audio signal does not include any side information/meta information on transients, the transient signal remover 100 comprises a transient detector 103, a fade-out/fade-in calculator 104 and a first portion remover 105. In an alternative embodiment in which information on transients in the audio signal have been collected as attached to the audio signal by an encoding device as discussed later on with respect to FIG. 9, the transient signal remover 100 comprises a side information extractor 106, which extracts the side information attached to the audio signal as indicated by line 107. The information on the transient time may be provided to the fade-out/fade-in calculator 104 as illustrated by line 107. When, however, the audio signal includes, as meta information, not (only) the transient time, i.e. the accurate time at which the transient event is occurring, but the start/stop time of the portion to be excluded from the audio signal, i.e. the start time and the stop time of the "first portion" of the audio signal, then the fade-out/fade-in calculator 104 is not needed as well and the start/stop time information can be directly forwarded to the first portion remover 105 as illustrated by line 108. Line 108 illustrates an option and all other lines, which are indicated by broken lines, are optional as well.

In FIG. 2, the fade-in/fade-out calculator 104 outputs side information 109. This side information 109 is different from the start/stop times of the first portion, since the nature of the processing in the processor 110 of FIG. 1 is taken into account. Furthermore, the input audio signal is fed into the remover 105.

The fade-out/fade-in calculator 104 provides for the start/stop times of the first portion. These times are calculated based on the transient time so that not only the transient event, but also some samples surrounding the transient event are removed by the first portion remover 105. Furthermore, it is advantageous to not just cut out the transient portion by a time domain rectangular window, but to perform the extraction by a fade-out portion and a fade-in portion. For performing a fade-out or/a fade-in portion, any kind of window having a smoother transition compared to a rectangular filter such as a raised cosine window can be applied so that the frequency response of this extraction is not as problematic as it would be when a rectangular window would be applied, although this is also an option. This time domain windowing operation outputs the remainder of the windowing operation, i.e. the audio signal without the windowed portion.

Any transient suppression method can be applied in this context including such transient suppression methods leaving a transient-reduced or fully non-transient residual signal after the transient removal. Compared to a complete removal of the transient portion, in which the audio signal is set to zero over a certain portion of time, the transient suppression is advantageous in situations, in which a further processing of the audio signal would suffer from portions set to zero, since such portions set to zero are very unnatural for an audio signal.

Naturally, all calculations performed by the transient detector 103 and the fade-out/fade-in calculator 104 can be applied as well on the encoding side as discussed in connection with FIG. 9 as long as the results of these calculations such as the transient time and/or the start/stop times of the first portion are transmitted to a signal manipulator either as side information or meta information together with the audio signal or separately from the audio signal such as within a separate audio meta data signal to be transmitted via a separate transmission channel.

Figure 3A:
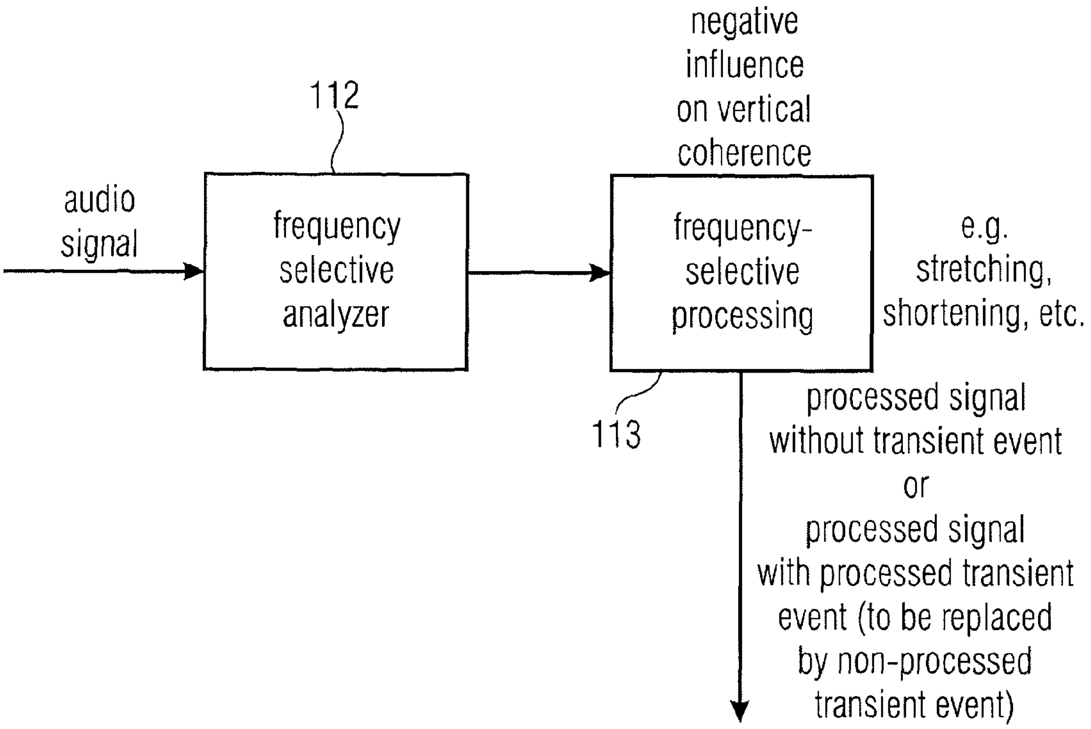
FIG. 3*a* illustrates an implementation of a signal processor of FIG. 1.

FIG. 3*a* illustrates an implementation of the signal processor 110 of FIG. 1. This implementation comprises a frequency selective analyzer 112 and a subsequently-connected frequency-selective processing device 113. The frequency-selective processing device 113 is implemented such that it applies a negative influence on the vertical coherence of the original audio signal. Examples for this processing is the stretching of a signal in time or the shortening of a signal in time where this stretching or shortening is applied in a frequency-selective manner, so that, for example, the processing introduces phase shifts into the processed audio signal, which are different for different frequency bands.

Figure 3B:
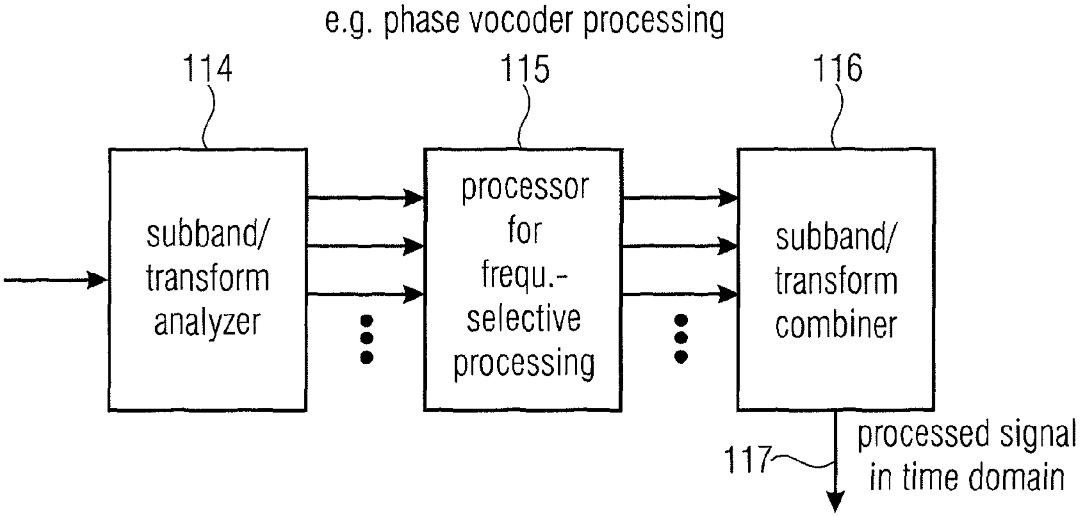
FIG. 3*b* illustrates a further embodiment for implementing the signal processor of FIG. 1.

A way of processing is illustrated in FIG. 3B in the context of a phase vocoder processing. Generally, a phase vocoder comprises a sub-band/transform analyzer 114, a subsequently-connected processor 115 for performing a frequency-selective processing of a plurality of output signals provided by item 114 and, subsequently, a sub-band/transform combiner 116, which combines the signals processed by item 115 in order to finally obtain a processed signal in the time domain at output 117 where this processed signal in the time domain, again, is a full bandwidth signal or a lowpass filtered signal as long as the bandwidth of the processed signal 117 is larger than the bandwidth represented by a single branch between item 115 and 116, since the sub-band/transform combiner 116 performs a combination of frequency-selective signals.

Further details on the phase vocoder are subsequently discussed in connection with FIGS. 5A, 5B, 5C and 6.

Figure 4:
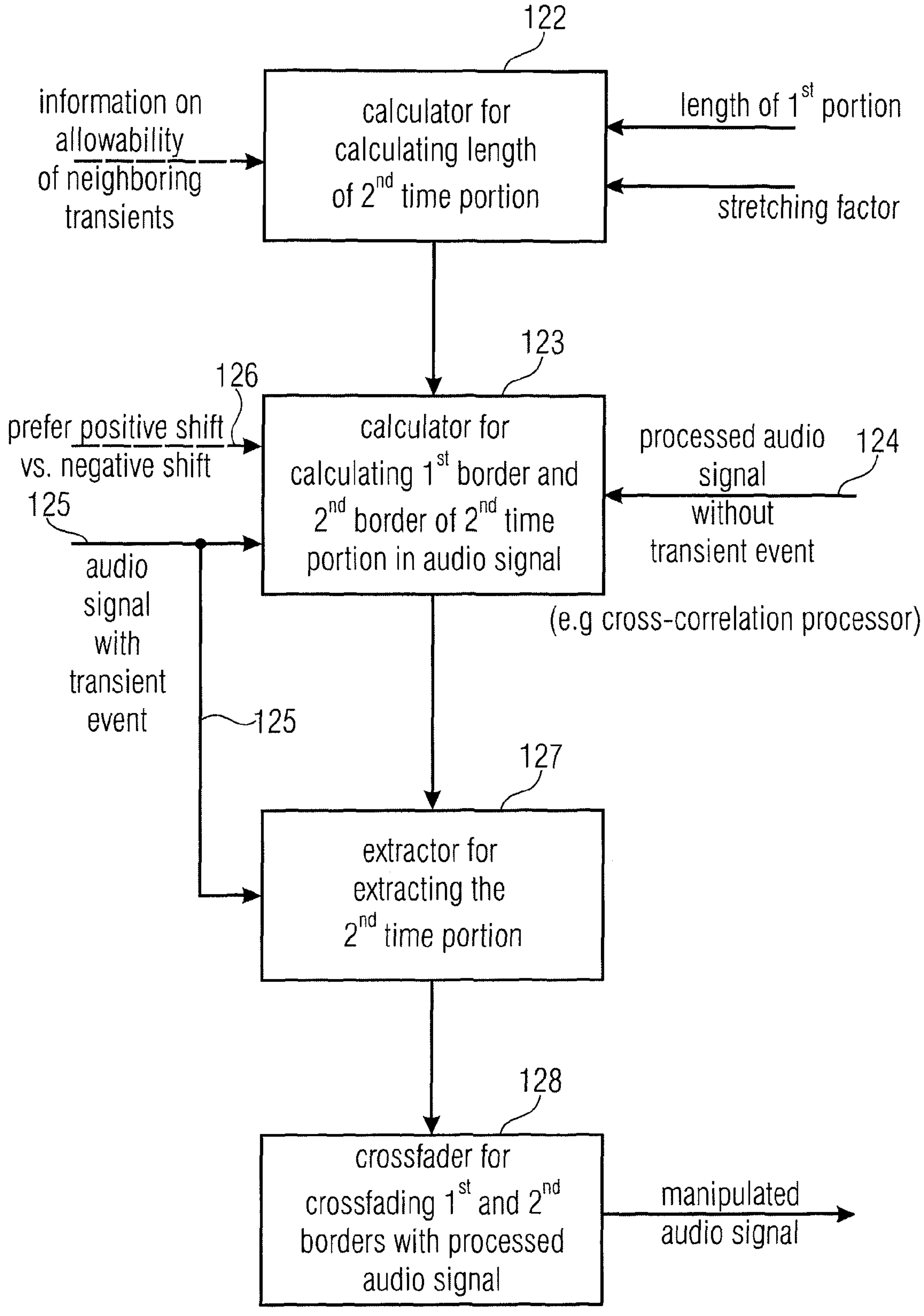
FIG. 4 illustrates an implementation of the signal inserter of FIG. 1.

Subsequently, an implementation of the signal inserter 120 of FIG. 1 is discussed and is depicted in FIG. 4. The signal inserter comprises a calculator 122 for calculating the length of the second time portion. In order to be able to calculate the length for the second time portion in the embodiment in which the transient portion has been removed before the signal processing in the signal processor 110 in FIG. 1, the length of the removed first portion and the time stretching factor (or the time shortening factor) are needed so that the length of the second time portion is calculated in item 122. These data items can be input from outside as discussed in connection with FIGS. 1 and 2. Exemplarily, the length of the second time portion is calculated by multiplying the length of the first portion by the stretching factor.

The length of the second time portion is forwarded to a calculator 123 for calculating the first border and the second border of the second time portion in the audio signal. In particular, the calculator 133 may be implemented to perform a cross-correlation processing between the processed audio signal without the transient event supplied at input 124 and the audio signal with the transient event, which provides the second portion as supplied at input 125. The calculator 123 is controlled by a further control input 126 so that a positive shift of the transient event within the second time portion is advantageous versus a negative shift of the transient event as discussed later.

The first border and the second border of the second time portion are provided to an extractor 127. The extractor 127 cuts out the portion, i.e. the second time portion out of the original audio signal provided at input 125. Since a subsequent cross-fader 128 is used, the cut-out takes place using a rectangular filter. In the cross-fader 128, the start portion of the second time portion and the stop portion of the second time portion are weighted by an increasing weight from 0 to 1 for the start portion and/or decreasing weight from 1 to 0 in the end portion so that in this cross-fade region, the end portion of the processed signal together with the start portion of the extracted signal, when added together, result in a useful signal. A similar processing is performed in the cross-fader 128 for the end of the second time portion and the beginning of the processed audio signal after the extraction. The cross-fading makes sure that no time domain artifacts occur which would otherwise be perceivable as clicking artifacts when the borders of the processed audio signal without the transient portion and the second time portion borders do not perfectly match together.

Subsequently, reference is made to FIGS. 5*a*, 5*b*, 5*c* and 6 in order to illustrate an implementation of the signal processor 110 in the context of a phase vocoder.

Figure 5A:
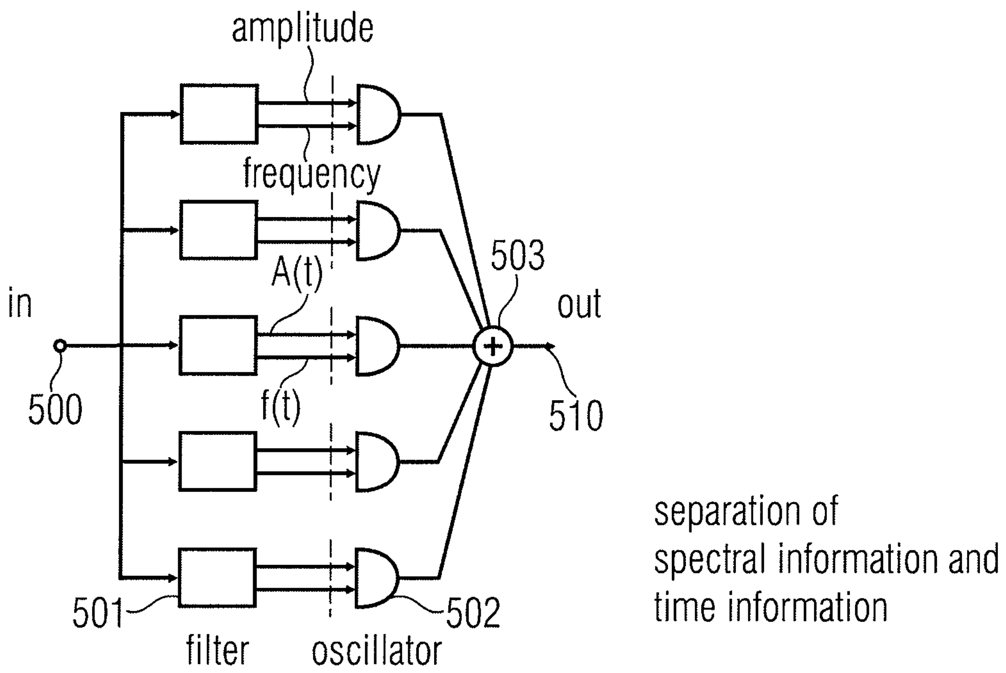
FIG. 5*a* illustrates an overview of the implementation of a vocoder to be used in the signal processor of FIG. 1.

In the following, with reference to FIGS. 5 and 6, implementations for a vocoder are illustrated according to the present invention. FIG. 5*a* shows a filterbank implementation of a phase vocoder, wherein an audio signal is fed in at an input 500 and obtained at an output 510. In particular, each channel of the schematic filterbank illustrated in FIG. 5*a* includes a bandpass filter 501 and a downstream oscillator 502. Output signals of all oscillators from every channel are combined by a combiner, which is for example implemented as an adder and indicated at 503, in order to obtain the output signal. Each filter 501 is implemented such that it provides an amplitude signal on the one hand and a frequency signal on the other hand. The amplitude signal and the frequency signal are time signals illustrating a development of the amplitude in a filter 501 over time, while the frequency signal represents a development of the frequency of the signal filtered by a filter 501.

Figure 5B:
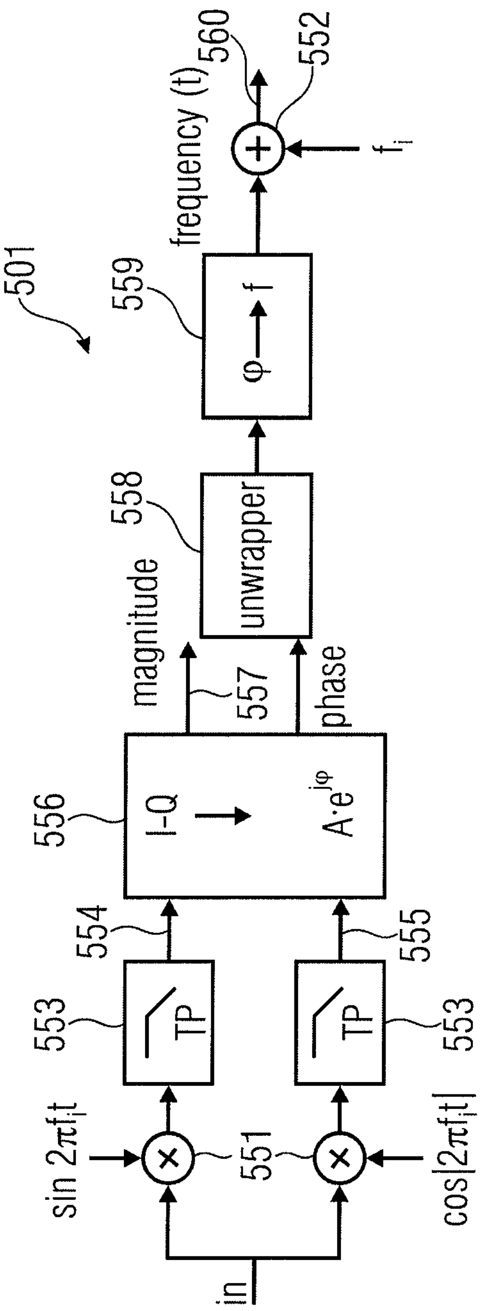
FIG. 5*b* shows an implementation of parts (analysis) of a signal processor of FIG. 1.

A schematical setup of filter 501 is illustrated in FIG. 5*b*. Each filter 501 of FIG. 5*a* may be set up as in FIG. 5*b*, wherein, however, only the frequencies $f_i$ supplied to the two input mixers 551 and the adder 552 are different from channel to channel. The mixer output signals are both lowpass filtered by lowpasses 553, wherein the lowpass signals are different insofar as they were generated by local oscillator frequencies (LO frequencies), which are out of phase by 90°. The upper lowpass filter 553 provides a quadrature signal 554, while the lower filter 553 provides an in-phase signal 555. These two signals, i.e. I and Q, are supplied to a coordinate transformer 556 which generates a magnitude phase representation from the rectangular representation. The magnitude signal or amplitude signal, respectively, of FIG. 5*a* over time is output at an output 557. The phase signal is supplied to a phase unwrapper 558. At the output of the element 558, there is no phase value present any more which is between 0 and 360°, but a phase value which increases linearly. This "unwrapped" phase value is supplied to a phase/frequency converter 559 which may for example be implemented as a simple phase difference former which subtracts a phase of a previous point in time from a phase at a current point in time to obtain a frequency value for the current point in time. This frequency value is added to the constant frequency value $f_i$ of the filter channel i to obtain a temporarily varying frequency value at the output 560. The frequency value at the output 560 has a direct component=$f_i$ and an alternating component=the frequency deviation by which a current frequency of the signal in the filter channel deviates from the average frequency $f_i$.

Thus, as illustrated in FIGS. 5*a* and 5*b*, the phase vocoder achieves a separation of the spectral information and time information. The spectral information is in the special channel or in the frequency $f_i$ which provides the direct portion of the frequency for each channel, while the time information is contained in the frequency deviation or the magnitude over time, respectively.

Figure 5C:
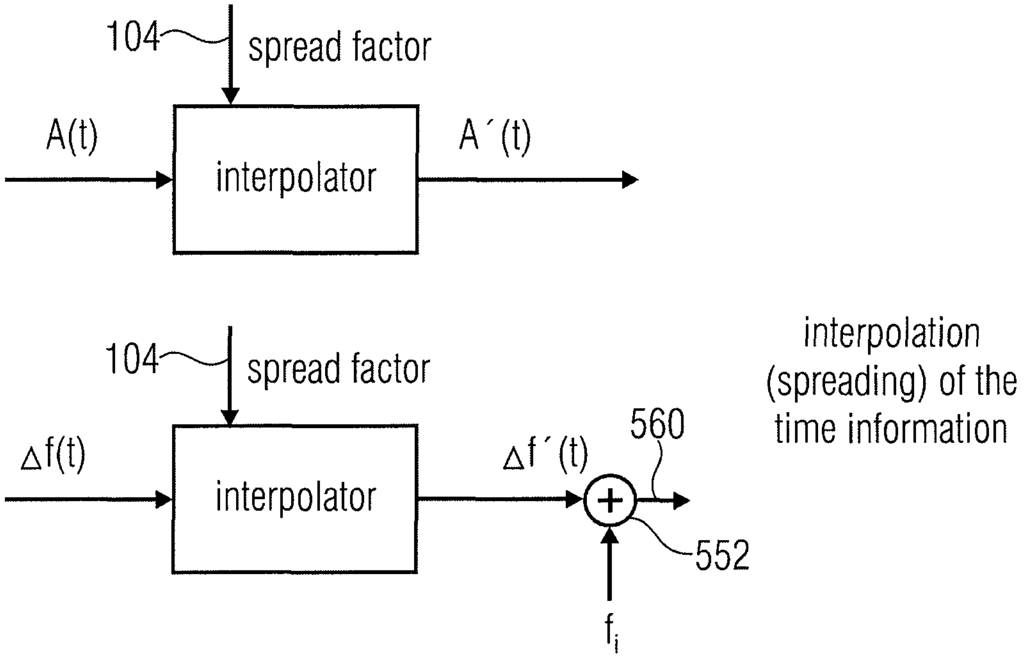
FIG. 5*c* illustrates other parts (stretching) of a signal processor of FIG. 1.

FIG. 5*c* shows a manipulation as it is executed for the bandwidth increase according to the invention, in particular, in the vocoder and, in particular, at the location of the illustrated circuit plotted in dashed lines in FIG. 5*a*.

For time scaling, e.g. the amplitude signals A(t) in each channel or the frequency of the signals f(t) in each signal may be decimated or interpolated, respectively. For purposes of transposition, as it is useful for the present invention, an interpolation, i.e. a temporal extension or spreading of the signals A(t) and f(t) is performed to obtain spread signals A'(t) and f'(t), wherein the interpolation is controlled by a spread factor in a bandwidth extension scenario. By the interpolation of the phase variation, i.e. the value before the addition of the constant frequency by the adder 552, the frequency of each individual oscillator 502 in FIG. 5*a* is not changed. The temporal change of the overall audio signal is slowed down, however, i.e. by the factor 2. The result is a temporally spread tone having the original pitch, i.e. the original fundamental wave with its harmonics.

By performing the signal processing illustrated in FIG. 5*c*, wherein such a processing is executed in every filter band channel in FIG. 5*a*, and by the resulting temporal signal then being decimated in a decimator, the audio signal is shrunk back to its original duration while all frequencies are doubled simultaneously. This leads to a pitch transposition by the factor 2 wherein, however, an audio signal is obtained which has the same length as the original audio signal, i.e. the same number of samples.

Figure 6:
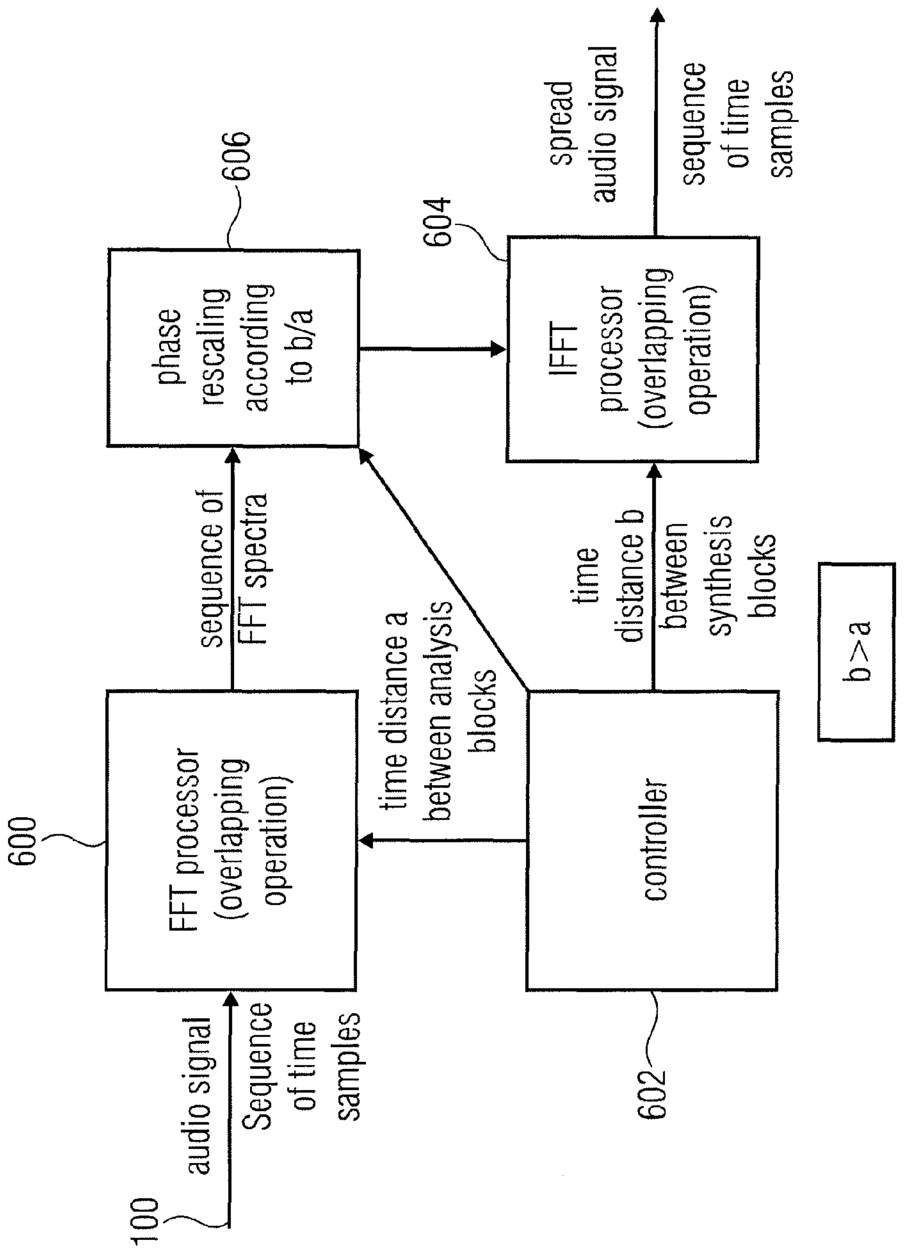
FIG. 6 illustrates a transform implementation of a phase vocoder to be used in the signal processor of FIG. 1.

As an alternative to the filterbank implementation illustrated in FIG. 5*a*, a transform implementation of a phase vocoder may also be used as depicted in FIG. 6. Here, the audio signal 100 is fed into an FFT processor, or more generally, into a Short-Time-Fourier-Transform-Processor 600 as a sequence of time samples. The FFT processor 600 is implemented schematically in FIG. 6 to perform a time windowing of an audio signal in order to then, by means of an FFT, calculate magnitude and phase of the spectrum, wherein this calculation is performed for successive spectra which are related to blocks of the audio signal, which are strongly overlapping.

In an extreme case, for every new audio signal sample a new spectrum may be calculated, wherein a new spectrum may be calculated also e.g. only for each twentieth new sample. This distance a in samples between two spectra is given by a controller 602. The controller 602 is further implemented to feed an IFFT processor 604 which is implemented to operate in an overlapping operation. In particular, the IFFT processor 604 is implemented such that it performs an inverse short-time Fourier Transformation by performing one IFFT per spectrum based on magnitude and phase of a modified spectrum, in order to then perform an overlap add operation, from which the resulting time signal is obtained. The overlap add operation eliminates the effects of the analysis window.

A spreading of the time signal is achieved by the distance b between two spectra, as they are processed by the IFFT processor 604, being greater than the distance a between the spectrums in the generation of the FFT spectrums. The basic idea is to spread the audio signal by the inverse FFTs simply being spaced apart further than the analysis FFTs. As a result, temporal changes in the synthesized audio signal occur more slowly than in the original audio signal.

Without a phase rescaling in block 606, this would, however, lead to artifacts. When, for example, one single frequency bin is considered for which successive phase values by 45° are implemented, this implies that the signal within this filterbank increases in the phase with a rate of 1/8 of a cycle, i.e. by 45° per time interval, wherein the time interval here is the time interval between successive FFTs. If now the inverse FFTs are being spaced farther apart from each other, this means that the 45° phase increase occurs across a longer time interval. This means that due to the phase shift a mismatch in the subsequent overlap-add process occurs leading to unwanted signal cancellation. To eliminate this artifact, the phase is rescaled by exactly the same factor by which the audio signal was spread in time. The phase of each FFT spectral value is thus increased by the factor b/a, so that this mismatch is eliminated.

While in the embodiment illustrated in FIG. 5*c* the spreading by interpolation of the amplitude/frequency control signals was achieved for one signal oscillator in the filterbank implementation of FIG. 5*a*, the spreading in FIG. 6 is achieved by the distance between two IFFT spectra being greater than the distance between two FFT spectra, i.e. b being greater than a, wherein, however, for an artifact prevention a phase rescaling is executed according to b/a.

With regard to a detailed description of phase-vocoders reference is made to the following documents:

"The phase Vocoder: A tutorial", Mark Dolson, Computer Music Journal, vol. 10, no. 4, pp. 14-27, 1986, or "New phase Vocoder techniques for pitch-shifting, harmonizing and other exotic effects", L. Laroche and M. Dolson, Proceedings 1999 IEEE Workshop on applications of signal processing to audio and acoustics, New Paltz, N.Y., Oct. 17-20, 1999, pages 91 to 94; "New approached to transient processing interphase vocoder", A. Röbel, Proceeding of the 6th international conference on digital audio effects (DAFx-03), London, UK, Sep. 8-11, 2003, pages DAFx-1 to DAFx-6; "Phase-locked Vocoder", Meller Puckette, Proceedings 1995, IEEE ASSP, Conference on applications of signal processing to audio and acoustics, or U.S. Pat. No. 6,549,884.

Alternatively, other methods for signal spreading are available, such as, for example, the 'Pitch Synchronous Overlap Add' method. Pitch Synchronous Overlap Add, in short PSOLA, is a synthesis method in which recordings of speech signals are located in the database. As far as these are periodic signals, the same are provided with information on the fundamental frequency (pitch) and the beginning of each period is marked. In the synthesis, these periods are cut out with a certain environment by means of a window function, and added to the signal to be synthesized at a suitable location: Depending on whether the desired fundamental frequency is higher or lower than that of the database entry, they are combined accordingly denser or less dense than in the original. For adjusting the duration of the audible, periods may be omitted or output in double. This method is also called TD-PSOLA, wherein TD stands for time domain and emphasizes that the methods operate in the time domain. A further development is the MultiBand Resynthesis OverLap Add method, in short MBROLA. Here the segments in the database are brought to a uniform fundamental frequency by a pre-processing and the phase position of the harmonic is normalized. By this, in the synthesis of a transition from a segment to the next, less perceptive interferences result and the achieved speech quality is higher.

In a further alternative, the audio signal is already bandpass filtered before spreading, so that the signal after spreading and decimation already contains the desired portions and the subsequent bandpass filtering may be omitted. In this case, the bandpass filter is set so that the portion of the audio signal which would have been filtered out after bandwidth extension is still contained in the output signal of the bandpass filter. The bandpass filter thus contains a frequency range which is not contained in the audio signal after spreading and decimation. The signal with this frequency range is the desired signal forming the synthesized high-frequency signal.

The signal manipulator as illustrated in FIG. 1 may, additionally, comprise the signal conditioner 130 for further processing the audio signal with the unprocessed "natural" or synthesized transient on line 121. This signal conditioner can be a signal decimator within a bandwidth extension application, which, at its output, generates a high-band signal, which can then be further adapted to closely resemble the characteristics of the original highband signal by using high frequency (HF) parameters to be transmitted together with an HFR (high frequency reconstruction) datastream.

Figure 7A:
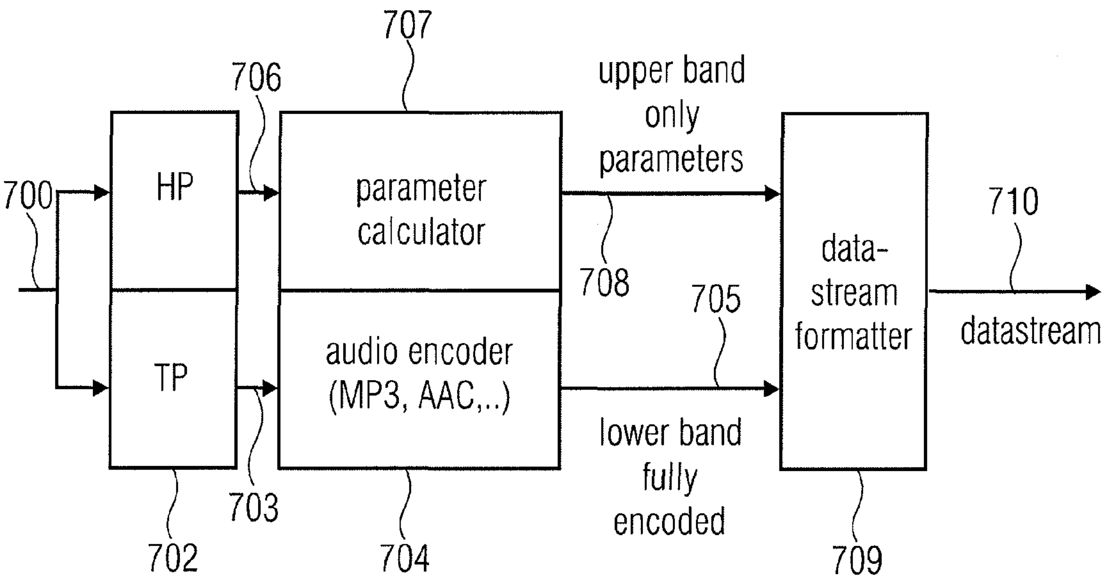
FIG. 7*a* illustrates an encoder side of a bandwidth extension processing scheme.
Figure 7B:
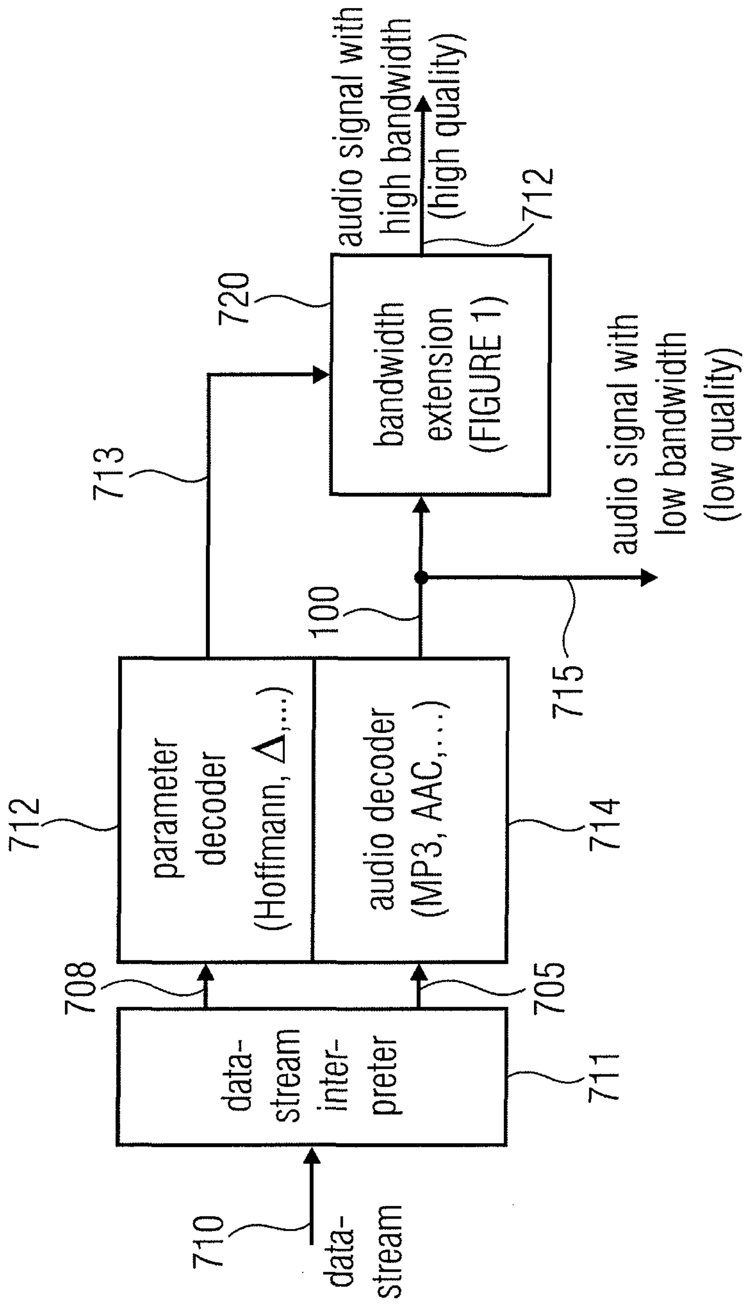
FIG. 7*b* illustrates a decoder side of a bandwidth extension scheme.

FIGS. 7*a* and 7*b* illustrate a bandwidth extension scenario, which can advantageously use the output signal of the signal conditioner within the bandwidth extension coder 720 of FIG. 7*b*. An audio signal is fed into a lowpass/highpass combination at an input 700. The lowpass/highpass combination on the one hand includes a lowpass (LP), to generate a lowpass filtered version of the audio signal 700, illustrated at 703 in FIG. 7*a*. This lowpass filtered audio signal is encoded with an audio encoder 704. The audio encoder is, for example, an MP3 encoder (MPEG1 Layer 3) or an AAC encoder, also known as an MP4 encoder and described in the MPEG4 Standard. Alternative audio encoders providing a transparent or advantageously perceptually transparent representation of the band-limited audio signal 703 may be used in the encoder 704 to generate a completely encoded or perceptually encoded and perceptually transparently encoded audio signal 705, respectively.

The upper band of the audio signal is output at an output 706 by the highpass portion of the filter 702, designated by "HP". The highpass portion of the audio signal, i.e. the upper band or HF band, also designated as the HF portion, is supplied to a parameter calculator 707 which is implemented to calculate the different parameters. These parameters are, for example, the spectral envelope of the upper band 706 in a relatively coarse resolution, for example, by representation of a scale factor for each psychoacoustic frequency group or for each Bark band on the Bark scale, respectively. A further parameter which may be calculated by the parameter calculator 707 is the noise floor in the upper band, whose energy per band may be related to the energy of the envelope in this band. Further parameters which may be calculated by the parameter calculator 707 include a tonality measure for each partial band of the upper band which indicates how the spectral energy is distributed in a band, i.e. whether the spectral energy in the band is distributed relatively uniformly, wherein then a non-tonal signal exists in this band, or whether the energy in this band is relatively strongly concentrated at a certain location in the band, wherein then rather a tonal signal exists for this band.

Further parameters consist in explicitly encoding peaks relatively strongly protruding in the upper band with regard to their height and their frequency, as the bandwidth extension concept, in the reconstruction without such an explicit encoding of prominent sinusoidal portions in the upper band, will only recover the same very rudimentarily, or not at all.

In any case, the parameter calculator 707 is implemented to generate only parameters 708 for the upper band which may be subjected to similar entropy reduction steps as they may also be performed in the audio encoder 704 for quantized spectral values, such as for example differential encoding, prediction or Huffman encoding, etc. The parameter representation 708 and the audio signal 705 are then supplied to a datastream formatter 709 which is implemented to provide an output side datastream 710 which will typically be a bitstream according to a certain format as it is for example standardized in the MPEG4 standard.

The decoder side, as it is especially suitable for the present invention, is in the following illustrated with regard to FIG. 7*b*. The datastream 710 enters a datastream interpreter 711 which is implemented to separate the bandwidth extension related parameter portion 708 from the audio signal portion 705. The parameter portion 708 is decoded by a parameter decoder 712 to obtain decoded parameters 713. In parallel to this, the audio signal portion 705 is decoded by an audio decoder 714 to obtain an audio signal.

Depending on the implementation, the audio signal 100 may be output via a first output 715. At the output 715, an audio signal with a small bandwidth and thus also a low quality may then be obtained. For a quality improvement, however, the inventive bandwidth extension 720 is performed to obtain the audio signal 712 on the output side with an extended or high bandwidth, respectively, and thus a high quality.

It is known from WO 98/57436 to subject the audio signal to a band limiting in such a situation on the encoder side and to encode only a lower band of the audio signal by means of a high quality audio encoder. The upper band, however, is only very coarsely characterized, i.e. by a set of parameters which reproduces the spectral envelope of the upper band. On the decoder side, the upper band is then synthesized. For this purpose, a harmonic transposition is proposed, wherein the lower band of the decoded audio signal is supplied to a filterbank. Filterbank channels of the lower band are connected to filterbank channels of the upper band, or are "patched", and each patched bandpass signal is subjected to an envelope adjustment. The synthesis filterbank belonging to a special analysis filterbank here receives bandpass signals of the audio signal in the lower band and envelope-adjusted bandpass signals of the lower band which were harmonically patched in the upper band. The output signal of the synthesis filterbank is an audio signal extended with regard to its bandwidth, which was transmitted from the encoder side to the decoder side with a very low data rate. In particular, filterbank calculations and patching in the filterbank domain may become a high computational effort.

The method presented here solves the problems mentioned. The inventive novelty of the method consists in that in contrast to existing methods, a windowed portion, which contains the transient, is removed from the signal to be manipulated, and in that from the original signal, a second windowed portion (generally different from the first portion) is additionally selected which may be reinserted into the manipulated signal such that the temporal envelope is preserved as much as possible in the environment of the transient. This second portion is selected such that it will accurately fit into the recess changed by the time-stretching operation. The accurate fitting-in is performed by calculating the maximum of the cross-correlation of the edges of the resulting recess with the edges of the original transient portion.

Thus, the subjective audio quality of the transient is no longer impaired by dispersion and echo effects.

Precise determination of the position of the transient for the purpose of selecting a suitable portion may be performed, e.g., using a moving centroid calculation of the energy over a suitable period of time.

Along with the time-stretching factor, the size of the first portion determines the needed size of the second portion. This size is to be selected such that more than one transient is accommodated by the second portion used for reinsertion only if the time interval between the closely adjacent transients is below the threshold for human perceptibility of individual temporal events.

Optimum fitting-in of the transient in accordance with the maximum cross-correlation may need a slight offset in time relative to the original position of same. However, due to the existence of temporal pre- and, particularly, post-masking effects, the position of the reinserted transient need not precisely match the original position. Due to the extended period of action of the post-masking, a shift of the transient in the positive time direction is advantageous.

By inserting the original signal portion, the timbre or pitch of the same will be changed when the sampling rate is changed by a subsequent decimation step. Generally, however, this is masked by the transient itself by means of psychoacoustic temporal masking mechanisms. In particular, if stretching by an integer factor occurs, the timbre will only be changed slightly, since outside of the environment of the transient, only every n.th (n=stretching factor) harmonic wave will be occupied.

Using the new method, artifacts (dispersion, pre- and post-echoes) which result during processing of transients by means of time stretching and transposition methods are effectively prevented. Potential impairment of the quality of superposed (possible tonal) signal portions is avoided.

The method is suitable for any audio applications wherein the reproduction speeds of audio signals or their pitches are to be changed.

Figure 8A:
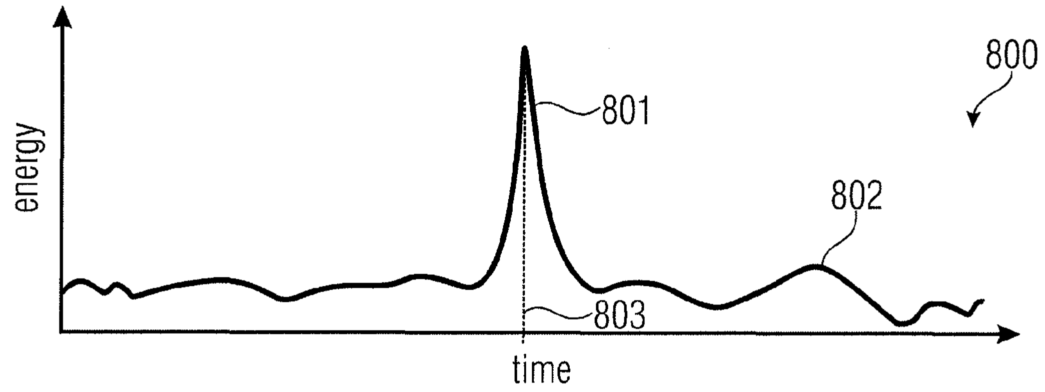
FIG. 8*a* illustrates an energy representation of an audio input signal with a transient event.

Subsequently, an embodiment in the context of FIGS. 8*a* to 8*e* is discussed. FIG. 8*a* illustrates a representation of the audio signal, but in contrast to a straight-forward time domain audio sample sequence, FIG. 8*a* illustrates an energy envelope representation, which can, for example, be obtained when each audio sample in a time domain sample illustration is squared. Specifically, FIG. 8*a* illustrates an audio signal 800 having a transient event 801 where the transient event is characterized by a sharp increase and decrease of energy over time. Naturally, a transient would also be a sharp increase of energy when this energy remains on a certain high level or a sharp decrease of energy when the energy has been on a high level for a certain time before the decrease. A specific pattern for a transient is, for example, a clapping of hands or any other tone generated by a percussion instrument. Additionally, transients are rapid attacks of an instrument, which starts playing a tone loudly, i.e. which provides sound energy into a certain band or a plurality of bands above a certain threshold level below a certain threshold time. Naturally, other energy fluctuation such as the energy fluctuation 802 of the audio signal 800 in FIG. 8*a* are not detected as transients. Transient detectors are known in the art and are extensively described in the literature and rely on many different algorithms, which may comprise frequency-selective processing and a comparison of a result of a frequency-selective processing to a threshold and a subsequent decision whether there was a transient or not.

Figure 8B:
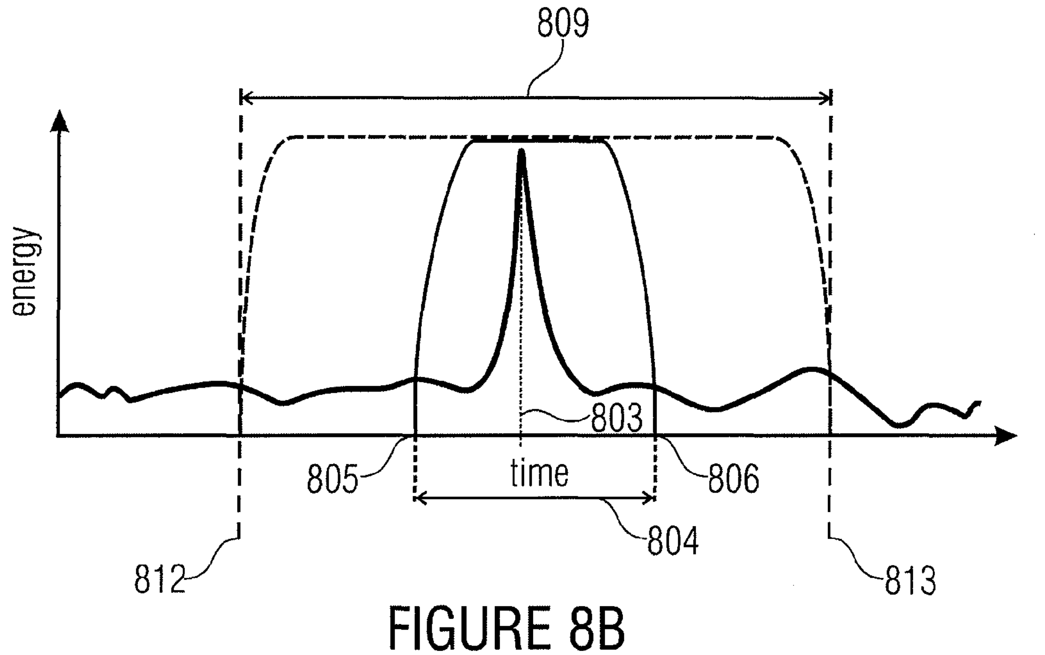
FIG. 8*b* illustrates the signal of FIG. 8*a*, but with a windowed transient.
Figure 8C:
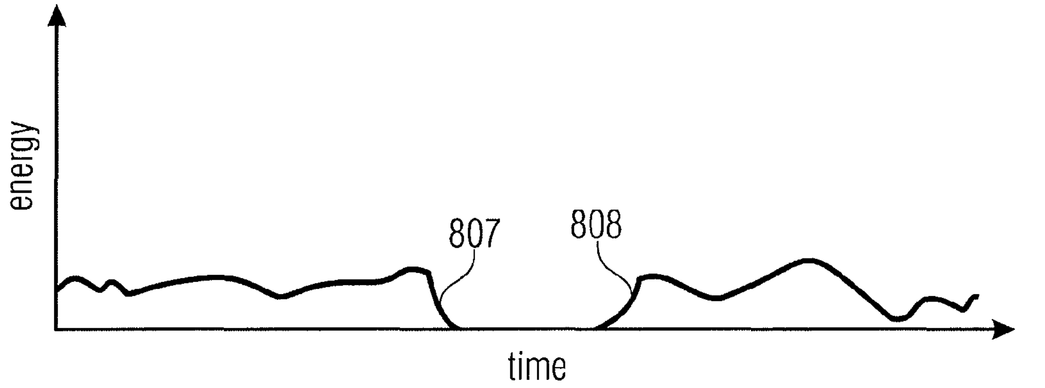
FIG. 8*c* illustrates a signal without the transient portion prior to being stretched.

FIG. 8*b* illustrates a windowed transient. The area delimited by the solid line is subtracted from the signal weighted by the depicted window shape. The area marked by the dashed line is added again after processing. Specifically, the transient occurring at a certain transient time 803 has to be cut out from the audio signal 800. To be on the safe side, not only the transient, but also some adjacent/neighboring samples are to be cut out from the original signal. Therefore, the first time portion 804 is determined, where the first time portion extends from a starting time instant 805 to a stop time instant 806. Generally, the first time portion 804 is selected so that the transient time 803 is included within the first time portion 804. FIG. 8*c* illustrates a signal without a transient prior to being stretched. As can be seen from slowly-decaying edges 807 and 808, the first time portion is not just cut out by a rectangular fitter/windower, but a windowing is performed to have slowly-decaying edges or flanks of the audio signal.

Figure 8D:
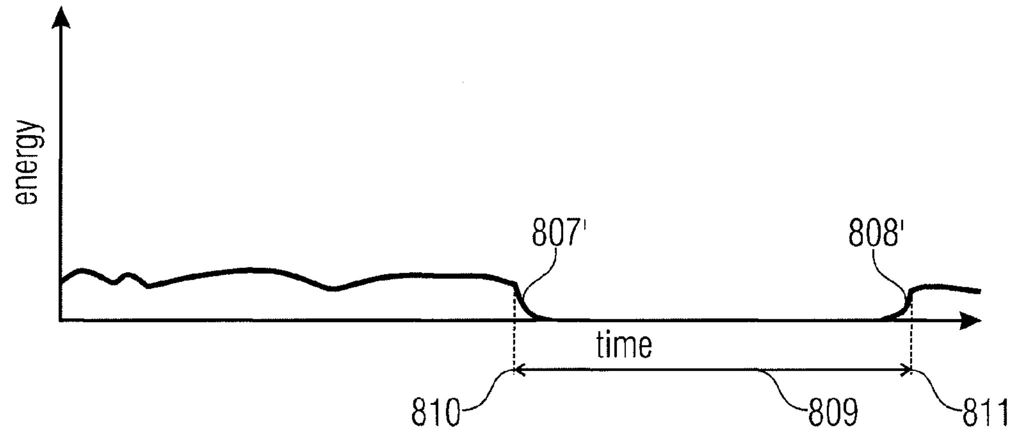
FIG. 8*d* illustrates the signal of FIG. 8*c* subsequent to being stretched.

Importantly, FIG. 8*c* now illustrates the audio signal on line 102 of FIG. 1, i.e. subsequent to the transient signal removal. The slowly-decaying/increasing flanks 807, 808 provide the fade-in or fade-out region to be used by the cross fader 128 of FIG. 4. FIG. 8*d* illustrates the signal of FIG. 8*c*, but in a stretched state, i.e. subsequent to the processing applied by the signal processor 110. Thus, the signal in FIG. 8*d* is the signal on line 111 of FIG. 1. Due to the stretching operation, the first portion 804 has become much longer. Thus, the first portion 804 of FIG. 8*d* has been stretched to the second time portion 809, which has a second time portion start instant 810 and a second time portion stop instant 811. By stretching the signal, the flanks 807, 808 have been stretched as well so that the time length of the flanks 807', 808' has been stretched as well. This stretching has to be accounted for when calculating the length of the second time portion as performed by the calculator 122 of FIG. 4.

Figure 8E:
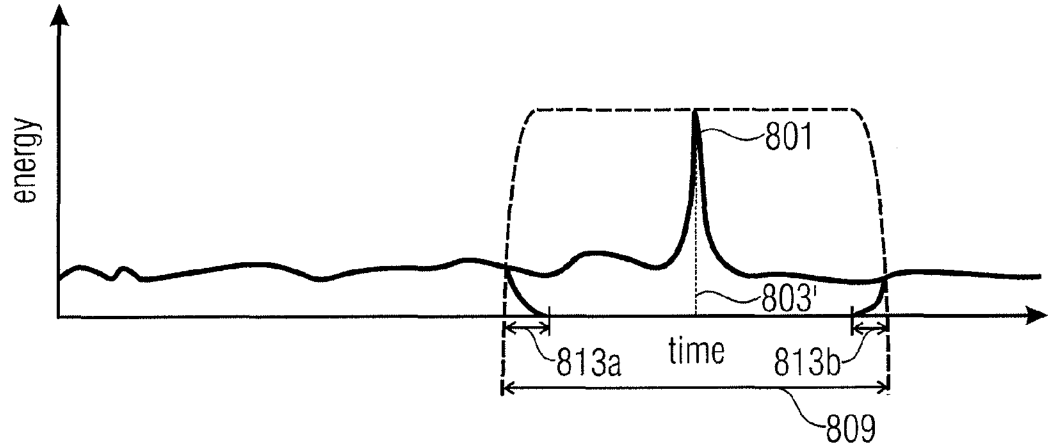
FIG. 8*e* illustrates the manipulated signal after the corresponding portion of the original signal has been inserted.

As soon as the length of the second time portion is determined, a portion corresponding to the length of the second time portion is cut out from the original audio signal illustrated at FIG. 8*a* as indicated by the broken line in FIG. 8*b*. To this end, the second time portion 809 has been entered into FIG. 8*e*. As discussed, the start time instant 812, i.e. the first border of the second time portion 809 in the original audio signal and the stop time instant 813 of the second time portion, i.e. the second border of the second time portion in the original audio signal do not necessarily have to be symmetrical with respect to the transient event time 803, 803' so that the transient 801 is located on exactly the same time instant as it was in the original signal. Instead, the time instants 812, 813 of FIG. 8*b* can be slightly varied so that the cross correlation results between a signal shape on these borders in the original signal is, as much as possible, similar to corresponding portions in the stretched signal. Thus, the actual position of the transient 803 can be moved out of the center of the second time portion until a certain degree, which is indicated in FIG. 8*e* by reference number 803' indicating a certain time with respect to the second time portion, which deviates from the corresponding time 803 with respect to the second time portion in FIG. 8*b*. As discussed in connection with FIG. 4, item 126, a positive shift of the transient to a time 803' with respect to a time 803 is advantageous due to the post-masking effect, which is more pronounced than the pre-masking effect. FIG. 8*e* additionally illustrates the crossover/transition regions 813*a*, 813*b* in which the cross-fader 128 provides a cross-fader between the stretched signal without the transient and the copy of the original signal including the transient.

As illustrated in FIG. 4, the calculator for calculating the length of the second time portion 122 is configured for receiving the length of the first time portion and the stretching factor. Alternatively, the calculator 122 can also receive an information on the allowability of neighboring transients to be included within one and the same first time portion. Therefore, based on this allowability, the calculator may determine the length of the first time portion 804 by itself and, depending on the stretching/shortening factor, then calculates the length of the second time portion 809.

As discussed above, the functionality of the signal inserter is that the signal inserter removes a suitable area for the gap in FIG. 8*e*, which is enlarged within the stretched signal from the original signal and fits this suitable area, i.e. the second time portion into the processed signal using a cross-correlation calculation for determining time instant 812 and 813 and performing a cross-fading operation in cross-fade regions 813*a* and 813*b* as well.

Figure 9:
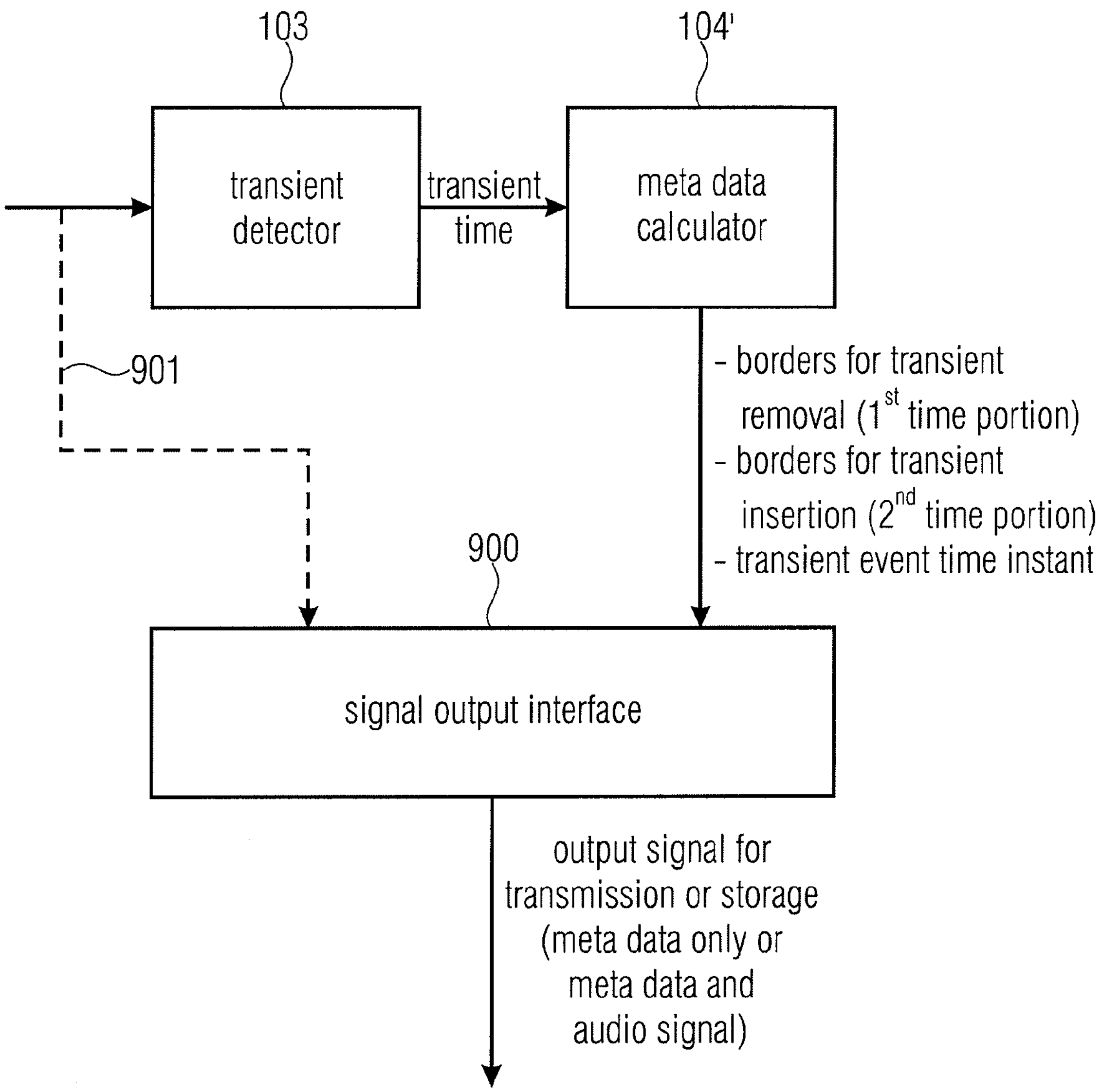
FIG. 9 illustrates an apparatus for generating side information for an audio signal.

FIG. 9 illustrates an apparatus for generating side information for an audio signal, which can be used in the context of the present invention when the transient detection is performed on the encoder side and side information regarding this transient detection is calculated and transmitted to a signal manipulator, which then would represent the decoder side. To this end, a transient detector similar to the transient detector 103 in FIG. 2 is applied for analyzing the audio signal including a transient event. The transient detector calculates a transient time, i.e. time 803 in FIG. 1 and forwards this transient time to a meta data calculator 104', which can be structured similarly to the fade-out/fade-in calculator 104' in FIG. 2. Generally, the meta data calculator 104' can calculate meta data to be forwarded to a signal output interface 900 where this meta data may comprise borders for the transient removal, i.e. borders for the first time portion, i.e. borders 805 and 806 of FIG. 8*b* or borders for the transient insertion (second time portion) as illustrated at 812, 813 in FIG. 8*b* or the transient event time instant 803 or even 803'. Even in the latter case, the signal manipulator would be in the position to determine all needed data, i.e. the first time portion data, the second time portion data, etc. based on a transient event time instant 803.

The meta data as generated by item 104' are forwarded to the signal output interface so that the signal output interface generates a signal, i.e. an output signal for transmission or storage. The output signal may include only the meta data or may include the meta data and the audio signal where, in the latter case, the meta data would represent side information for the audio signal. To this end, the audio signal can be forwarded to the signal output interface 900 via line 901. The output signal generated by the signal output interface 900 can be stored on any kind of storage medium or can be transmitted via any kind of transmission channel to a signal manipulator or any other device requiring transient information.

It is to be noted that although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

The described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Depending on certain implementation requirements of the inventive methods, the inventive methods can be implemented in hardware or in software. The implementation can be performed using a digital storage medium, in particular, a disc, a DVD or a CD having electronically-readable control signals stored thereon, which co-operate with programmable computer systems such that the inventive methods are performed. Generally, the present can therefore be implemented as a computer program product with a program code stored on a machine-readable carrier, the program code being operated for performing the inventive methods when the computer program product runs on a computer. In other words, the inventive methods are, therefore, a computer program having a program code for performing at least one of the inventive methods when the computer program runs on a computer. The inventive meta data signal can be stored on any machine readable storage medium such as a digital storage medium.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Apparatus for manipulating an audio signal comprising a transient event, comprising:

a signal processor, wherein the signal processor is configured for processing the audio signal comprising a first portion comprising the transient event to acquire a processed audio signal, wherein the signal processor is configured to generate a perceptually degraded transient portion in the processed audio signal by stretching or shortening the first portion of the audio signal comprising the transient event so that the processed audio signal comprises a duration greater than a duration of the first portion of the audio signal or smaller than a duration of the first portion of the audio signal;

a signal inserter for inserting a second time portion into the processed audio signal at a signal location, where the perceptually degraded transient portion is located in the processed audio signal to obtain a manipulated audio signal, wherein the inserted second time portion includes an unmodified copy of the signal or a copy of the signal including the transient in which only a start portion or an end portion has been modified, wherein the signal inserter is configured to determine the second time portion so that the second time portion comprises the transient event not influenced by the processing performed by the signal processor to generate the perceptually degraded transient portion, and wherein the signal inserter is configured to determine the second time portion so that the second time portion comprises a duration different from the first time portion, wherein in the case of stretching, the second time portion is longer than the first time portion or in the case of shortening, the second time portion is smaller than the first time portion.

2. Apparatus in accordance with claim 1, further comprising a transient signal remover for removing the first time portion from the audio signal to acquire the transient-reduced audio signal, the first time portion comprising the transient event.

3. Apparatus in accordance with claim 1, in which the signal processor is configured to process the transient-reduced audio signal in a frequency-dependent way so that the processing introduces phase shifts into the transient-reduced audio signal, which are different for different spectral components.

4. Apparatus in accordance with claim 1, in which the signal inserter is configured to generate the second time portion by copying at least the first time portion so that the second time portion comprises at least a copy of the first time portion from the audio signal comprising the transient event.

5. Apparatus in accordance with claim 1, in which the signal processor performs a stretching of the transient-reduced audio signal, and in which the signal inserter is configured to copy a portion of the audio signal including the transient event and a signal portion before or after the transient event so that the signal portion before or after the transient event comprises, together with the first portion, the duration of the second portion.

6. Apparatus in accordance with claim 5, in which the signal inserter is configured to determine the second portion so that the second portion comprises an overlap with the processed audio signal at the beginning or at an end of the second time portion and in which the signal inserter is configured to perform a cross-fade at a border between the processed audio signal and the second time portion.

7. Apparatus in accordance with claim 1, in which the signal processor comprises a vocoder, a phase vocoder or an (P)SOLA processor.

8. Apparatus in accordance with claim 1, further comprising a signal conditioner for conditioning the manipulated audio signal by decimation or interpolation of a time-discrete version of the manipulated audio signal.

9. Apparatus in accordance with claim 1, in which the signal inserter is configured:

for determining a time length of the second time portion to be copied from the audio signal comprising the transient event, for determining a start time instant of the second time portion or a stop time instant of the second time portion by finding a maximum of a cross correlation calculation, so that a border of the second time portion matches with a corresponding border of the processed audio signal, wherein a position in time of the transient event in the manipulated audio signal coincides with the position in time of the transient event in the audio signal.

10. Apparatus in accordance with claim 1, further comprising a transient detector for detecting the transient event in the audio signal, or further comprising a side information extractor for extracting and interpreting a side information associated with the audio signal, the side information indicating a time position of the transient event or indicating a start time instant or a stop time instant of the first time portion or the second time portion.

11. Method of manipulating an audio signal comprising a transient event, comprising:

processing the audio signal comprising a first portion comprising the transient event to acquire a processed audio signal, wherein the processing comprises generating a perceptually degraded transient portion in the processed audio signal by stretching or shortening the first portion of the audio signal comprising the transient event so that the processed audio signal comprises a duration greater than a duration of the first portion of the audio signal or smaller than a duration of the first portion of the audio signal;

inserting a second time portion into the processed audio signal at a signal location where the perceptually degraded transient portion is located in the processed audio signal so that a manipulated audio signal is acquired, wherein the inserted second time portion includes an unmodified cop of the signal or a copy of the signal including the transient in which only a start portion or an end portion has been modified, wherein the inserting comprises determining the second time portion so that the second time portion comprises the transient event not influenced by the processing to generate the perceptually degraded transient portion, and wherein the inserting comprises determining the second time portion so that the second time portion comprises a duration different from the first time portion, wherein in the case of stretching, the second time portion is longer than the first time portion or in the case of shortening, the second time portion is smaller than the first time portion.

12. A non-transitory storage medium having stored thereon a computer program comprising a program code for performing, when running on a computer, the method of manipulating an audio signal comprising a transient event, comprising:

processing the audio signal comprising a first portion comprising the transient event to acquire a processed audio signal, wherein the processing comprises generating a perceptually degraded transient portion in the processed audio signal by stretching or shortening the first portion of the audio signal comprising the transient event so that the processed audio signal comprises a duration greater than a duration of the first portion of the audio signal or smaller than a duration of the first portion of the audio signal;

inserting a second time portion into the processed audio signal at a signal location where the perceptually degraded transient portion is located in the processed audio signal so that a manipulated audio signal is acquired, wherein the inserted second time portion includes an unmodified copy of the signal or a copy of the signal including the transient in which only a start portion or an end portion has been modified, wherein the inserting comprises determining the second time portion so that the second time portion comprises the transient event not influenced by the processing to generate the perceptually degraded transient portion, and wherein the inserting comprises determining the second time portion so that the second time portion comprises a duration different from the first time portion, wherein in the case of stretching, the second time portion is longer than the first time portion or in the case of shortening, the second time portion is smaller than the first time portion.

* * * * *